(12) United States Patent
Poole

(10) Patent No.: US 6,535,671 B1
(45) Date of Patent: Mar. 18, 2003

(54) OPTICAL FIBER TAP WITH INTEGRAL REFLECTING SURFACE AND METHOD OF MAKING SAME

(75) Inventor: Craig D. Poole, Durham, NH (US)

(73) Assignee: Eigenlight Corporation, Somersworth, NH (US)

( * ) Notice: Subject to any disclaimer, the term of this patent is extended or adjusted under 35 U.S.C. 154(b) by 0 days.

(21) Appl. No.: 09/794,876

(22) Filed: Feb. 27, 2001

Related U.S. Application Data

(60) Provisional application No. 60/185,799, filed on Feb. 29, 2000.

(51) Int. Cl.[7] .................................................. G02B 6/26
(52) U.S. Cl. .............................. 385/48; 385/43; 385/32; 385/44
(58) Field of Search .............................. 385/48, 43, 32, 385/44, 140, 88

(56) References Cited

U.S. PATENT DOCUMENTS

| 4,426,215 A | 1/1984 | Murphy et al. ............... 65/4.21 |
| 4,799,949 A | 1/1989 | Keck et al. ................... 65/3.12 |
| 5,011,251 A | 4/1991 | Miller et al. ............. 350/96.15 |
| 5,037,170 A | 8/1991 | Uken et al. .................... 385/32 |
| 5,039,188 A | 8/1991 | Williams ..................... 385/32 |
| 5,251,277 A | 10/1993 | Young, Jr. .................... 385/43 |
| 5,411,566 A | 5/1995 | Poole et al. ................... 65/402 |
| 5,647,039 A | 7/1997 | Judkins et al. ................. 385/37 |
| 5,708,265 A | 1/1998 | Poole ..................... 250/227.14 |
| 6,347,178 B1 * | 2/2002 | Edwards et al. ............ 385/139 |

OTHER PUBLICATIONS

M. Born et al, Chapter 7.6.6, "Interference Filters" of Principles of Optics, Sixth Ed. (copyright 1980, Pergamon Press Ltd.), pp. 347–351.
S. E. Miller et al (eds.), Chapter 8, "Fiber Preform Preparation", by W. G. French et al, Optical Fiber Telecommunications, (copyright 1979, Academic Press), pp. 233–261.
D. Marcuse, Light Transmission Optics (copyright 1989, Krieger Publishing Co., Inc.), pp. 61–81.

* cited by examiner

Primary Examiner—Hung N. Ngo
(74) Attorney, Agent, or Firm—Michaelson & Wallace; Peter L. Michaelson

(57) ABSTRACT

An optical fiber tap for transferring optical energy out of an optical fiber having an optical fiber with a short tapered section for coupling optical energy into cladding modes, and a surrounding glass body fused to the optical fiber with the glass body having a polished surface positioned at an angle so as to reflect, by total internal reflection, cladding mode energy away from the optical fiber. An additional glass encapsulating tube is fused to and hermetically seals the glass body and tapered fiber section. For use in an optical power monitor, the optical fiber tap is integrated into a standard electronic package containing a photodiode to convert the tapped-out optical energy into an electrical signal representing the optical energy carried by the optical fiber.

28 Claims, 14 Drawing Sheets

OPTICAL FIBER TAP WITH INTEGRAL REFLECTING SURFACE AND METHOD OF MAKING SAME

CLAIM TO PRIORITY

This application claims priority of my co-pending United States provisional patent application titled "OPTICAL FIBER TAP WITH INTEGRAL REFLECTING SURFACE AND METHOD OF MAKING SAME" filed Feb. 29, 2000 and assigned Ser. No. 60/185,799.

BACKGROUND OF THE INVENTION

1. Field of the Invention

This invention relates to a component for coupling optical energy out of an optical fiber and, particularly to an optical fiber tap that greatly reduces overall size and volume of the tap compared to existing fused-fiber taps while maintaining high coupling efficiency to photodiodes for power monitoring applications in fiber optic systems.

2. Description of the Prior Art

The growth of optical fiber amplifiers and wavelength-division multiplexing (WDM) techniques in fiber optic systems has led to an increase in a number of active fiber optic components deployed in commercial telecommunications networks. With this development has come a need for monitoring devices that can provide information on the performance of these active components in order to maintain system performance levels and quickly address system faults when they occur. Such monitoring devices need to be highly reliable, low in cost, and small in size, the last property being of increasing importance as fiber optic equipment manufacturers compete to put more functionality into ever smaller spaces.

One of the most important monitoring functions in fiber optic systems is monitoring of optical power levels at various points in a fiber optic network. By monitoring optical power one obtains a good, though incomplete, indicator of system performance. For example, optical power is typically monitored both at an input and an output of optical fiber amplifiers to provide information on gain and saturation of the amplifier. In many cases, optical power from a laser that pumps the amplifier is also monitored. Another example is monitoring of optical power entering a receiver, such monitoring being necessary to insure that the receiver does not become saturated and thus performance degraded.

Known means for monitoring the optical power being carried by an optical fiber require the use of a tap to remove a small fraction of the optical power traveling in the fiber. The tapped-out light is typically sent to a photodiode that converts its optical signal to an electrical signal which is then processed electronically. Provided the ratio of optical power removed from the fiber to optical power remaining in the fiber is a fixed number, the electrical signal generated by the photodiode can serve as a measure of the optical power flowing in the fiber. Ideally, most of the optical power entering the tap passes through to the output and is unaffected by its presence.

Among known fiber optic taps, by far the most common is the fused fiber optic coupler formed by fusing two optical fibers together. In such a device, cores of the two fibers after fusing are sufficiently close in proximity that light traveling in one fiber is partially transferred to the other fiber, the former fiber being referred to as the "through leg" and the latter being referred to as the "tap-leg". In monitoring applications the light in the tap-leg, which is typically of less power than the light in the through-leg, is sent to a photodiode to generate an electrical signal. Fused fiber couplers are well known in the art and have been made to exhibit a variety of properties. See, for example, U.S. Pat. No. 4,426,215 (issued to K. A. Murphy on Jan. 17, 1984); U.S. Pat. No. 5,011,251 (issued to W. J. Miller et al on Apr. 30, 1991); and U.S. Pat. No. 5,251,277 (issued to D. R. Young on Oct. 5, 1993).

Fused fiber couplers suffer from a number of disadvantages when used in power monitoring applications. First among these is a necessity of terminating four fiber ends (two ends for each fiber). A power monitor is a three port device consisting of an optical input, an optical output and an electrical output. When constructing power monitors using fused fiber couplers, it is necessary to terminate the tap-leg to the photodiode and also terminate the unused input port. In manufacturing fiber optic components, termination of fiber ends is a significant contributor to labor costs.

A second disadvantage of fused fiber couplers is their physical size. Although their packaging volume can be small, they tend to be elongated in one dimension owing to the need to fuse the two fibers together over a sufficient length to obtain the desired coupling without inducing excessive optical loss. This puts a practical lower limit on the size of fused fiber couplers and makes their integration into optoelectronic modules rather difficult. In addition, termination of the tap-leg to a photodiode for monitoring optical power requires a further increase in a longest package dimension. A still further limitation on the physical size of fused fiber couplers arises from a need to add a protective housing and substrate for the fibers after they are fused together owing to the fragile condition of the fused fibers.

Another known means for making an optical fiber tap is to induce a microbend in the fiber. The microbend causes a fraction of optical power to scatter out of the side of the fiber. In power monitoring applications the scattered light is directed on to a photodiode by means of mirrors or lenses. Examples of optical fiber taps using microbending are given in U.S. Pat. No. 5,037,170 (issued to W. D. Uken et al on Aug. 6, 1991); U.S. Pat. No. 5,039,188 (issued to G. F. Williams on Aug. 13, 1991); and U.S. Pat. No. 5,708,265 (issued to C. D. Poole on Jan. 13, 1998). The primary disadvantages of these optical taps are the need for additional optical components to collect the light that emerges from the side of the fiber onto a photodiode and a nonlinear trajectory of the fiber caused by the bending. Both of these features make integrating such devices into relatively small packages with photodiodes difficult and thus costly.

SUMMARY OF THE INVENTION

The present invention provides an optical tap that is highly reliable, small in size, and that can be integrated into miniature opto-electronic packages.

The invention accomplishes this by overcladding an optical fiber using a glass tube with a reflecting surface at one end. Optical energy is tapped out of the optical fiber by exciting cladding modes in the fiber just upstream of the glass tube. In the preferred embodiment the cladding modes are excited by inducing a taper in the fiber. By fusing the glass tube to the fiber, the cladding modes are able to enter the glass matrix of the tube and are reflected out by the reflecting surface at the downstream end of the glass tube. The reflecting surface is formed by polishing the that end of the glass tube at an approximate angle of 45 degrees prior to assembly. Through total internal reflection this surface reflects the cladding modes out at an approximate angle of 90 degrees to the fiber axis, thus making collection onto a photodiode easy and efficient.

In particular and in accordance with my inventive teachings, the present invention provides a means for tapping optical power out of a fiber, wherein the preferred embodiment comprises a silica tube fused to the optical fiber and having one end polished at an angle, a short segment of the optical fiber tapered down to induce cladding modes and an encapsulating tube of silica to enclose the assembly hermetically. According to my inventive technique, the silica tube is doped with $GeO_2$ so as to lower its softening point temperature and prevent excess loss when fusing to the optical fiber, while at the same time maintaining a refractive index in the silica tube equal to or higher than the cladding of the optical fiber.

According to my inventive technique, a device for monitoring optical power in an optical fiber is made by integrating the optical tap assembly into a photodiode package so that cladding mode light that is reflected out of the optical fiber falls on the photodiode, thus generating an electrical signal that represents the optical power flowing in the optical fiber.

An additional embodiment that makes use of my inventive teachings comprises a silica capillary tube that is preferentially doped with $GeO_2$ in a narrow annular region. This doped region, when the capillary tube is collapsed and fused onto the optical fiber, acts as a waveguide to collect the cladding light emerging from the fiber and deliver it to the photodiode at increased efficiency and with reduced wavelength dependence.

BRIEF DESCRIPTION OF THE DRAWINGS

The teachings of the present invention can be readily understood by considering the following detailed description in conjunction with the accompanying drawing in which.

To facilitate reader understanding, identical reference numerals are used to denote identical or similar elements that are common to the figures. The reader should bear in mind that these figures are not drawn to scale.

DETAILED DESCRIPTION OF THE PREFERRED EMBODIMENT

Figure 1:
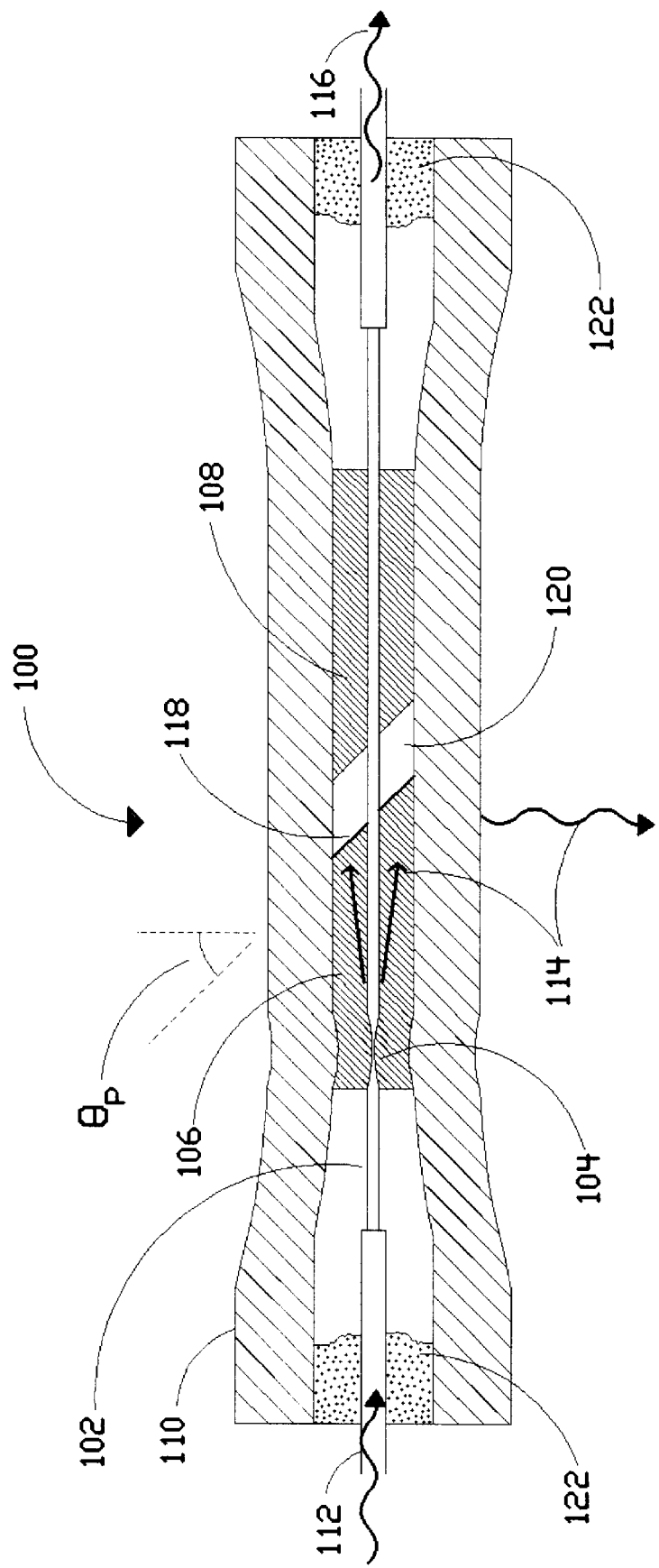
FIG. 1 is a cross-sectional view of the preferred embodiment of the optical fiber tap according to my invention.

Referring to the drawings, FIG. 1 shows in cross-section fiber optic tap 100 comprising optical fiber 102, tapered region 104, reflecting tube 106, spacer tube 108, encapsulating tube 110, reflecting surface 118, and epoxy 122. Reflecting tube 106 and spacer tube 108 are fused to optical fiber 102, which has its protective coating removed in the region inside of encapsulating tube 110. Encapsulating tube 110 is also fused to the outer surface of reflecting tube 106 and spacer tube 108, thus creating a hermetic seal around space 120 between reflecting tube 106 and spacer tube 108. Preferably, reflecting tube 106, spacer tube 108, and encapsulating tube 110 are made of fused silica ($SiO_2$) in order to closely match the thermal expansion coefficient of optical fiber 102 and thereby minimize stresses caused by fusing these components together. Epoxy 122 secures the input and output ends of fiber 102 to encapsulating tube 110.

In the following description of the operation of optical tap 100 of FIG. 1, assume that optical fiber 102 comprises a central core of refractive index n1 surrounded by a cladding having a lower refractive index n2. In practice, either or both the core and cladding may have non-constant refractive index profiles of varying complexity and shape. Also, for the ensuing description, assume that optical energy 112 flowing in optical fiber 102 is in a guided mode of the fiber prior to entering optical tap 100. As is well known in the art, light is said to be in a guided mode when the radial distribution of its energy remains fixed as that light propagates along the length of an optical fiber. The majority of optical energy of such guided modes is also typically located within a higher-index core region of an optical fiber. By contrast, light is said to be in a cladding mode of an optical fiber when its radial distribution of energy expands as it propagates along the length of a fiber. In addition, light that is in a cladding mode typically has a majority of its optical energy in the lower-index cladding that surrounds the core.

Referring again to FIG. 1, optical energy 112 encounters tapered region 104 upon entering optical tap 100. Tapered region 104 is a short section of optical fiber 102 in which the diameter of the fiber has been reduced by stretching the fiber while it is heated. Tapered region 104 couples a small fraction of optical energy into one or more cladding modes of fiber 102, while leaving the majority of optical energy 116 in a guided mode. The optical energy coupled into the cladding modes by taper 104 expands radially outward as it propagates, with a portion of this optical energy entering a glass matrix of reflecting tube 106. Optical energy 114, representing the portion of optical energy entering the glass matrix of reflecting tube 106, is reflected downward by reflecting surface 118. Preferably, reflecting surface 118 is polished at an angle θp as shown in FIG. 1, where θp is greater than or equal to an angle for total internal reflection. As is well known in the art, the angle for total internal reflection θt is determined by the refractive index nr of reflecting tube 106 and the refractive index ns of the surrounding space 120 and is expressed by the formula θt =arcsin(ns/nr). For example, for a fused silica reflecting tube with surrounding vacuum the angle θt for total internal reflection is approximately 44 degrees.

In the preferred embodiment, the distance between tapered region 104 and reflecting surface 118, as well as the length of reflecting tube 106, are selected so that the majority of optical energy that is scattered into the cladding of optical fiber 102 expands into the glass matrix of reflecting tube 106 before reaching reflecting surface 118. In addition, an outside diameter of reflecting tube 106 should be selected to be sufficiently large such that optical energy 114 does not expand beyond the glass matrix of reflecting tube 106. For example, at a wavelength of 1550 nm a reflecting tube of length 3 mm and diameter 0.6 mm was observed to reflect greater than 80% of cladding mode light when the tapered region was positioned at the end of reflecting tube 106 opposite to reflecting surface 118.

Figure 2:
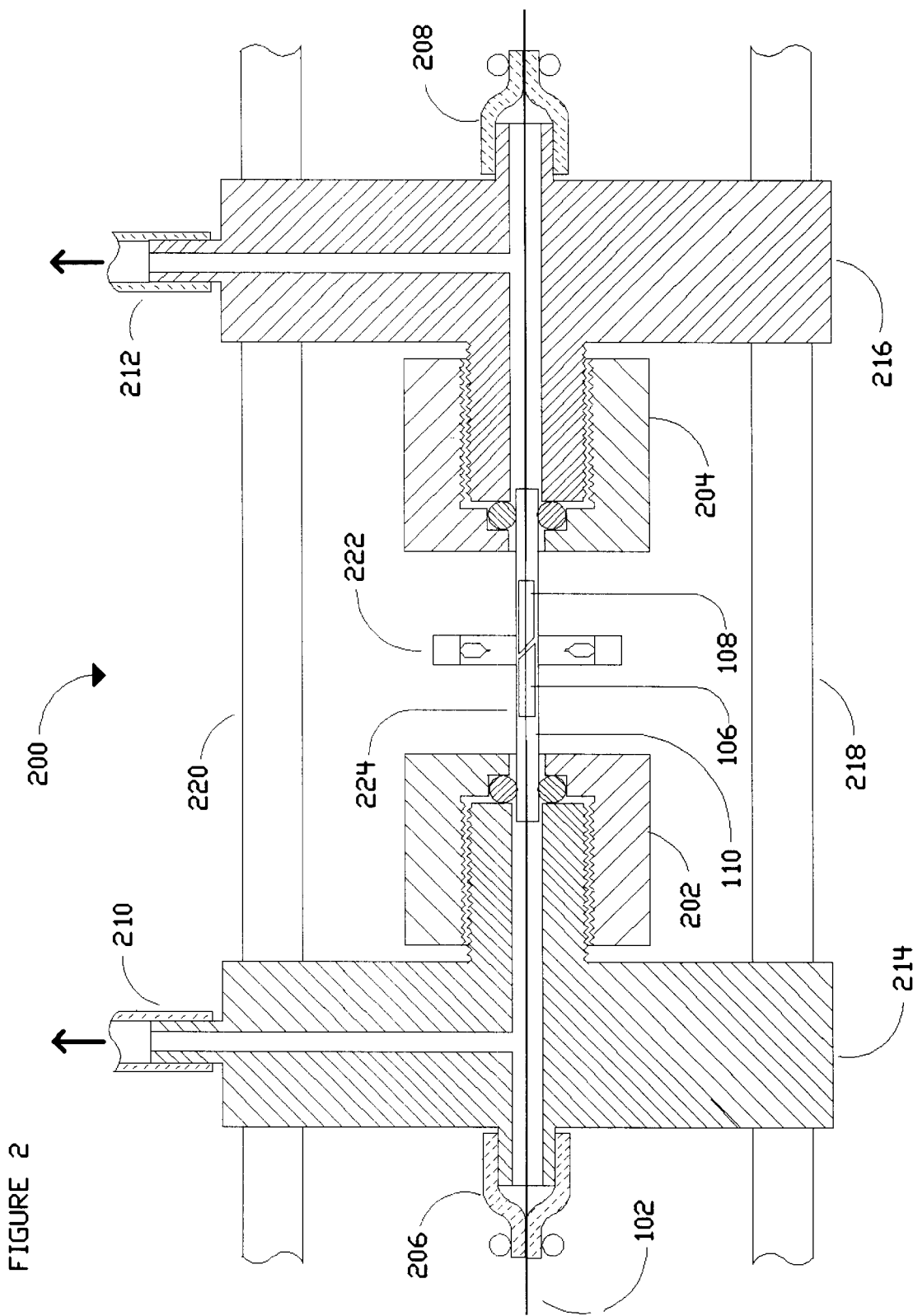
FIG. 2 is a cross-sectional view of an apparatus for fabricating the optical fiber tap of FIG. 1.

Fabrication of optical tap 100 is accomplished using fusion fixture 200 shown in cross-section in FIG. 2. Prior to mounting in fusion fixture 200, optical fiber 102 has a portion of its protective jacket removed to expose a length of bare cladding roughly the length of encapsulating tube 110. The fiber is first threaded through the central bore of reflecting tube 106 and spacer tube 108, both having an inner bore diameter larger than the outside diameter of coated optical fiber 102. Encapsulating tube 110, whose inside bore diameter is larger than the outside diameters of both reflecting tube 106 and spacer tube 108, is slid over optical fiber 102 and reflecting tube 106 and spacer tube 108. The assembly consisting of encapsulating tube 110, optical fiber 102, reflecting tube 106, and spacer tube 108 is mounted into fusion fixture 200 by threading one end of optical fiber 102 through compression fitting 202 and out though rubber tube 206. A corresponding end of encapsulating tube 110 is then inserted into compression fitting 202. The other end of optical fiber 102 is threaded through compression fitting 204 and rubber tube 208 and the corresponding end of encapsulating tube 110 inserted into compression fitting 204. A vacuum seal is formed by tightening compression fittings 202 and 204 around encapsulating tube 110, and by pinching the rubber tubes 206 and 208 around optical fiber 102. Tension is applied to optical fiber 102 to maintain optical fiber 102 in a straight trajectory. A vacuum pump (not shown) creates a vacuum within encapsulating tube 110 by means of vacuum fittings 210 and 212 which are connected to the inner bore of encapsulating tube 110 through vacuum bases 214 and 216. Tension is applied to encapsulating tube 110 by applying a separating (tensile) force between vacuum base 214 and 216, which are free to slide on post supports 218 and 220.

Hydrogen torch 222 heats encapsulating tube 110, reflecting tube 106, spacer tube 108 and optical fiber 102 to their softening point temperature. Preferably, torch 222 is moved back and forth along the exposed length of encapsulating tube 110 during heating so as to distribute the heat uniformly during fusing. Through the combined effects of vacuum pressure and tension, encapsulating tube 110 collapses onto reflecting tube 106, and spacer 108, which, in turn, collapse onto optical fiber 102. The four components thus fuse together as illustrated in FIG. 1. As used here, two components are said to be "fused" together when molecular bonds exist between some of the constituent molecules of the two components.

Tapered region 104 of FIG. 1 is next formed by increasing the tension on encapsulating tube 110 while applying torch 222 to a fixed point 224 on the fused assembly. The point 224 is preferably 3 mm from the reflecting surface on reflecting tube 106. During the formation of the tapered region, optical loss through fiber 102 is monitored. When the specified loss is induced by applying heat to point 224, the heat is then removed. In order that tapered region 104 couple light to the cladding of fiber 102, the taper must be sufficiently abrupt. For example, a taper in which the diameter of a step index, single-mode fiber reduces by a factor of two over a distance of less than 1 millimeter will provide sufficient coupling.

The process of collapsing a silica tube onto the cladding of an optical fiber is referred to as overcladding. This process is often used in the making of fused fiber couplers for the purpose of providing a stable medium for the coupler (see for example, U.S. Pat. No. 4,799,949 issued to D. B. Keck et al on Jan. 24, 1989; and U.S. Pat. No. 5,251,277—both of which are incorporated by reference herein).

One difficulty encountered when overcladding an optical fiber is that excess optical loss is often induced due to microbending of the fiber. This excess loss can be greatly reduced by doping the tube used to overclad the fiber so as to lower its softening point temperature relative to the optical fiber being overclad.

In the preferred embodiment described here, reflecting tube 106 and spacer tube 108 are both doped with 3 mole % $GeO_2$. In addition to lowering the softening point temperature of the silica glass and thus reducing excess loss, $GeO_2$ raises the refractive index of the glass matrix of reflecting tube 106, thus facilitating the passage of optical energy from the cladding of fiber 102 into the glass matrix of reflecting tube 106.

Figure 3:
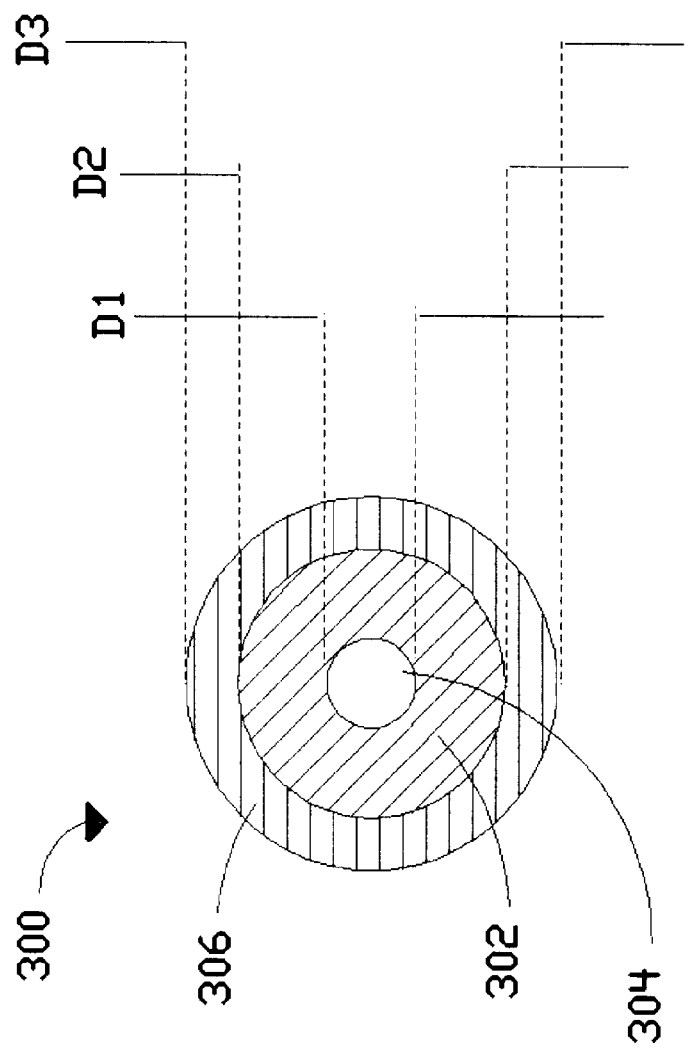
FIG. 3 is an end view of a tube preform used in the fabrication of the optical tap of FIG. 1.
Figure 4:
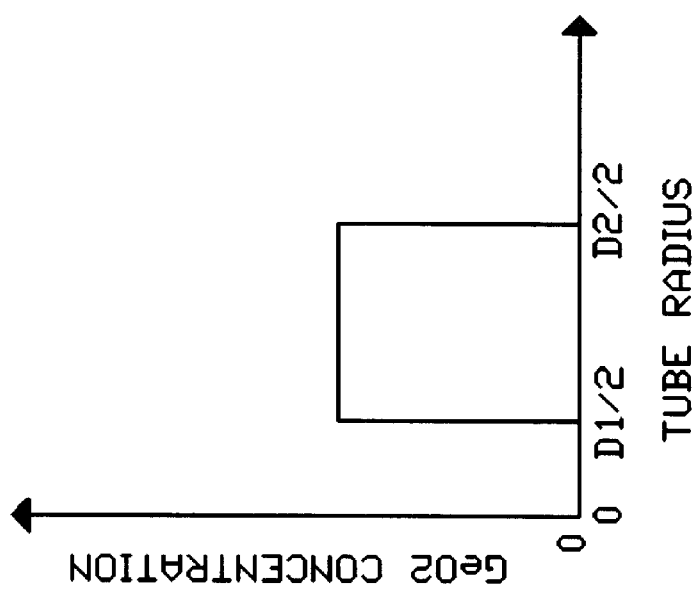
FIG. 4 is a graph of the dopant concentration of the tube preform of FIG. 3 plotted as a function of tube radius.

Reflecting tube 106 and spacer tube 108 are made by first making a tube preform that has been doped with $GeO_2$. The doping of silica preforms is well known in the art of optical fiber fabrication (see for example, Chapter 8, "Fiber Preform Preparation", by W. G. French, et al, of S. E. Miller et al (eds.), *Optical Fiber Telecommunications*, (© 1979, Academic Press), pages 233–261; which are incorporated by reference herein). FIG. 3 shows an end view of tube preform 300 used to make reflecting tube 106 and spacer tube 108. In the preferred embodiment described here, preform 300 is formed using the MCVD process(see for example, Chapter 8, "Fiber Preform Preparation", by W. G., French, et al, of S. E. Miller et al (eds.), *Optical Fiber Telecommunications*, (© 1979, Academic Press), pages 251–255; which are also incorporated by reference herein). Doped region 302 comprises silica doped with 3 mole % $GeO_2$. Doped region 302 surrounds central bore 304 and is itself surrounded by pure silica cladding 306. FIG. 4 graphically shows the concentration of $GeO_2$ in tube preform 300 plotted as a function of preform radius.

In optical fiber manufacturing, the central bore of a preform is eliminated after the preform has been doped and before it is drawn into fiber by collapsing the preform while applying heat and vacuum. This results in a solid rod preform. According to my inventive teachings, central bore 304 in preform 300 is left intact. Thus, when preform 300 is heated and drawn using techniques well known in the art of capillary tube formation, the resulting capillary tube has a central bore surrounded by a doped region analogous to starting preform 300. Reflecting tube 106 and spacer tube 108 are then cut from this capillary tubing. Exemplary values of the dimensions used in the preferred embodiment as they apply to tube preform 300 and the tubing drawn from this preform are as follows:

|  | D1 | D2 | D3 |
|---|---|---|---|
| Tube Preform | 5.2 mm | 14.6 mm | 20.5 mm |
| Drawn Tubing | 0.265 mm | 0.744 mm | 1.045 mm |

Although $GeO_2$ is used as the dopant in the preferred embodiment described here, other dopants can easily be used in place of $GeO_2$ to lower the softening point temperature while raising the refractive index of reflecting tube 106 and spacer tube 108, both relative to that of pure silica. Other dopants that have a similar effect on silica include $P_2O_5$ and $Al_2O_3$. Dopants such as $B_2O_3$ and F, which are used to dope overcladding tubes for fused fiber coupler fabrication, are not as desirable in the present application because they lower the refractive index of silica and thus would inhibit the passage of energy from the cladding of fiber 102 of FIG. 1 into the glass matrix of reflecting tube 106.

Figure 5:
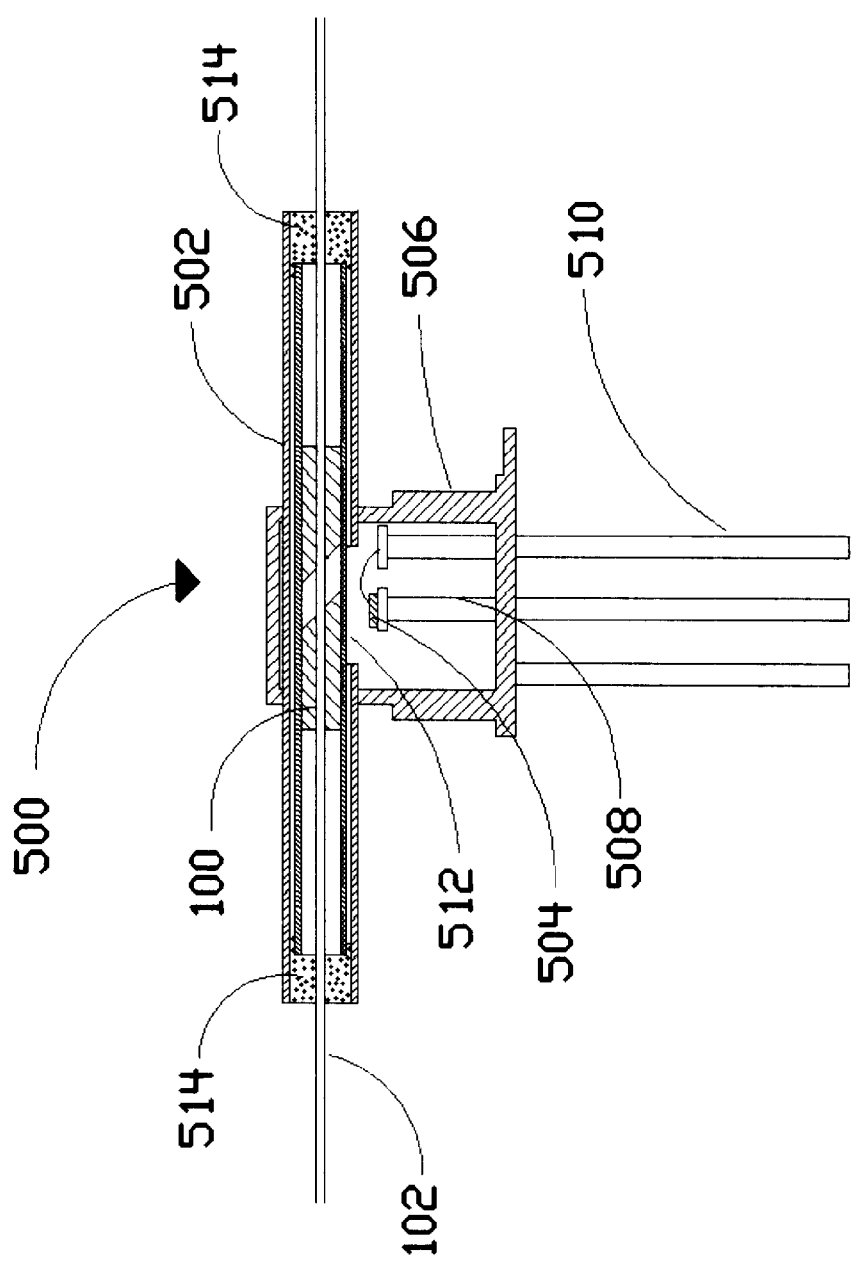
FIG. 5 is a cross-sectional view of a power monitor constructed using the optical fiber tap of FIG. 1.

According to my inventive teachings, optical tap 100 of FIG. 1 can be easily integrated into existing photodiode packages to make in-line fiber optic power monitors. FIG. 5 shows a cross-sectional view of optical power monitor 500 comprising optical tap 100, metal tube 502, photodiode 504, metal cap 506, header 508, and electrical leads 510. Metal tube 502 encloses optical tap 100 for protection against damage while allowing the light coupled out of optical tap 100 to exit through opening 512. Optical tap 100 is secured within tube 502 by means of epoxy 514, while metal tube 502 is soldered to cap 506. Cap 506 is in turn welded to header 508 to form a hermetic seal around photodiode 504.

Light coupled out of optical tap 100 strikes the photo-sensitive surface of photodiode 504 creating an electrical signal that is carried by electrical leads 510. Because the ratio of optical energy incident on photodiode 504 relative to the optical energy carried by fiber 102 is fixed, the electrical signal carried by electrical leads 510 can be used as a measure of the optical energy flowing in optical fiber 102.

Figure 6:
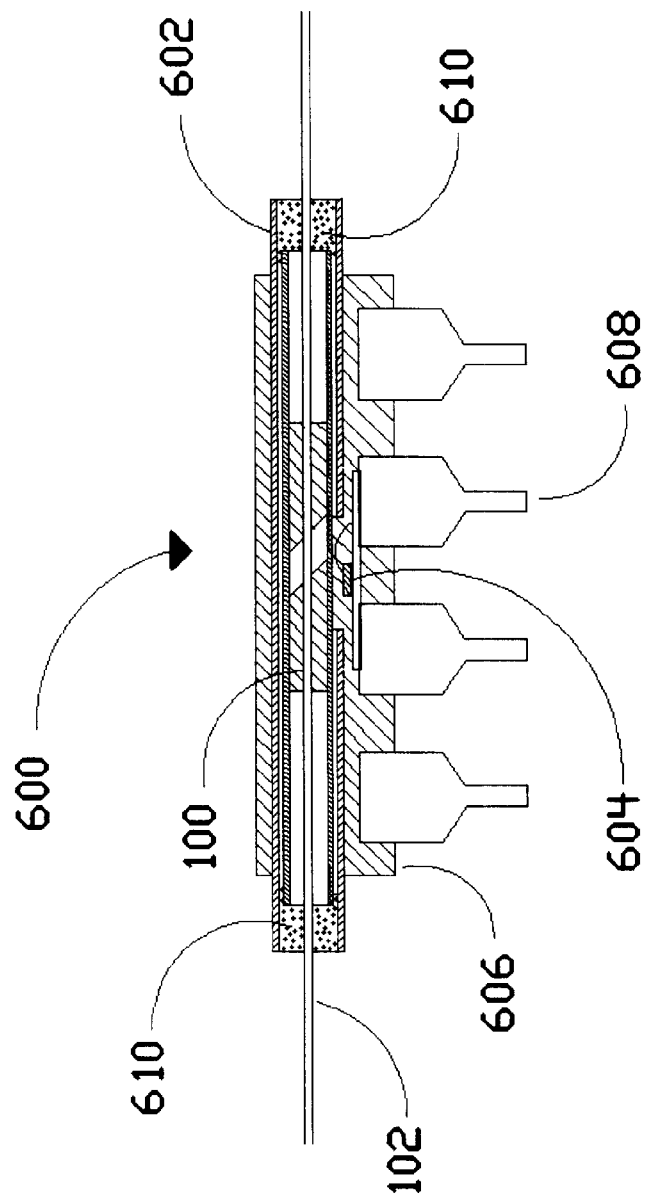
FIG. 6 is a cross-sectional view of an alternative embodiment of a power monitor which embodies my inventive teachings.

FIG. 6 shows a cross-sectional view of power monitor 600, consisting of optical tap 100 integrated into a standard 8-pin dip package. In addition to optical tap 100, power monitor 600 comprises metal tube 602, photodiode 604, plastic encapsulating matrix 606, and electrical leads 608. Optical tap 100 is secured within metal tube 602 with epoxy 610, while plastic matrix 606 completely encapsulates and secures metal tube 602 in position above photodiode 604. Except for packaging, power monitor 600 operates in a manner identical to power monitor 500 of FIG. 5.

Figure 7:
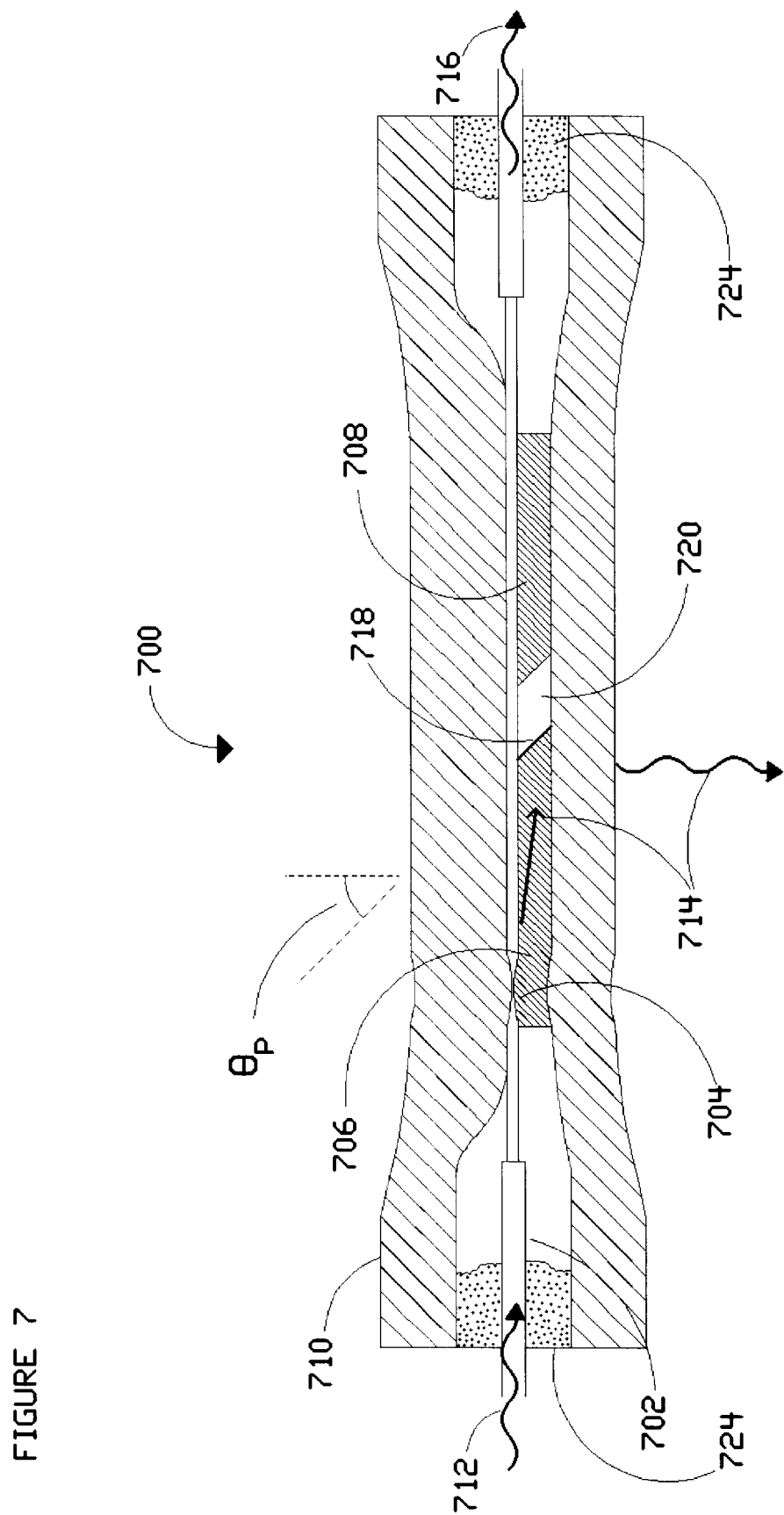
FIG. 7 is a cross-sectional view of an alternative embodiment of an optical fiber tap which embodies my inventive teachings.

FIG. 7 shows a cross-sectional view of optical tap 700, which is an alternative embodiment of optical tap 100 shown in FIG. 1. Optical tap 700 comprises optical fiber 702, fiber taper 704, solid glass member 706, glass spacer 708, encapsulating tube 710, and reflecting surface 718. Glass member 706, rather than a reflecting tube, is fused to optical fiber 702, which has its protective coating removed in the region inside of encapsulating tube 710. Encapsulating tube 710 is also fused to optical fiber 702, as well as glass member 706 and spacer 708, to create a hermetic seal around space 720. Preferably glass member 706, spacer 708, and encapsulating tube 710 are made of fused silica in order to closely match the thermal expansion coefficient of optical fiber 702.

Optical tap 700 operates in a manner similar to optical tap 100 of FIG. 1. Optical power coupled into the cladding of optical fiber 702 by tapered region 704 enters into glass member 706 and is reflected out by reflecting surface 718. Surface 718 is formed by polishing the end of glass member 706 to form angle θp, this angle being sufficient to cause total internal reflection of coupled light 714 at surface 718. Preferably, glass member 706 is doped with $GeO_2$ to lower its softening point temperature and raise its refractive index.

Optical tap 700 is formed in a manner similar to optical tap 100 using fixture 200 of FIG. 2.

Figure 8:
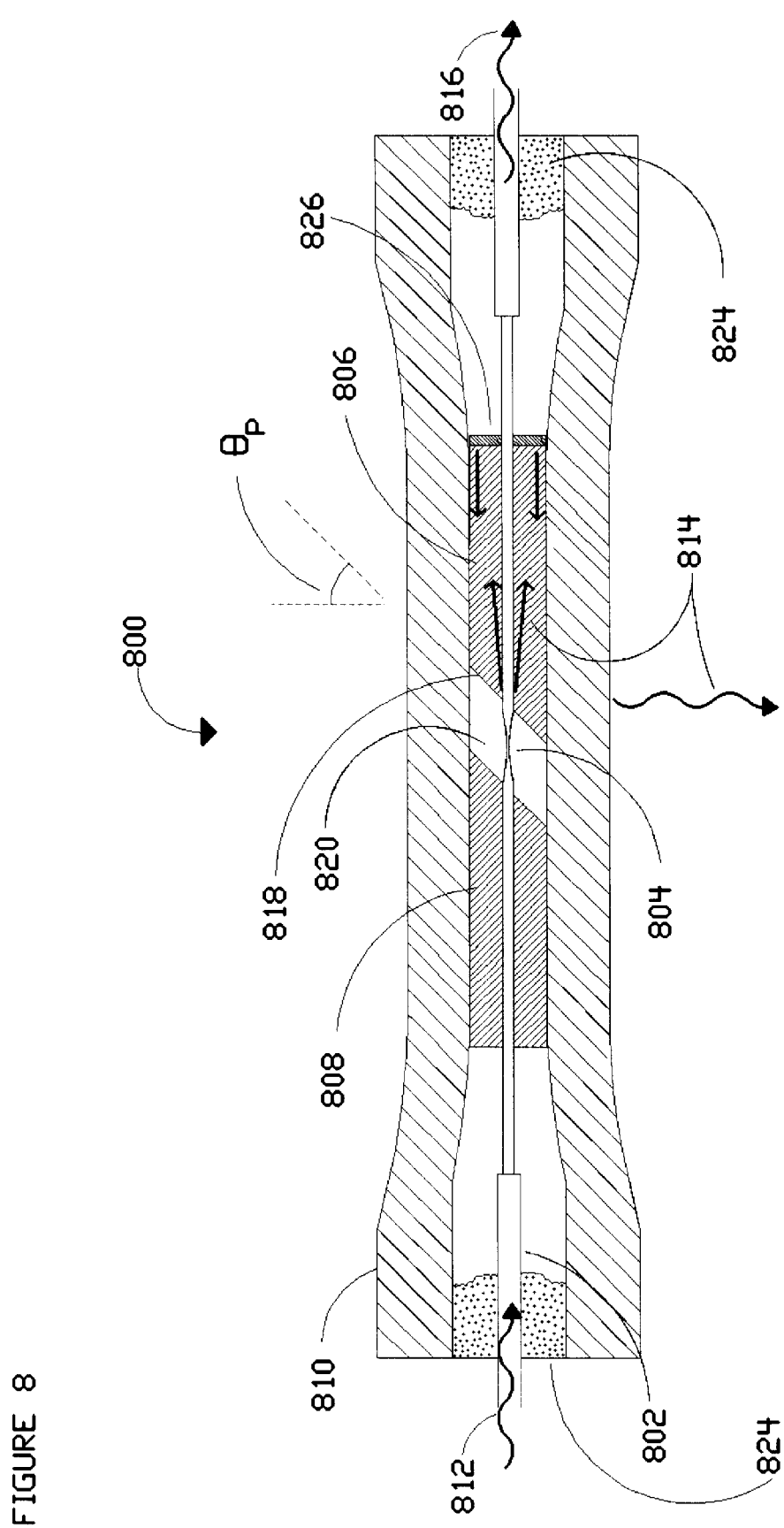
FIG. 8 is a cross-sectional view of a wavelength selective optical tap according to my inventive teachings.

An additional embodiment of optical tap 100 that is wavelength selective is shown in FIG. 8. Wavelength-selective optical taps are useful in WDM applications for monitoring specific wavelength channels at the exclusion of other channels. Optical fiber tap 800 comprises optical fiber 802, tapered region 804, reflecting tube 806, spacer tube 808, encapsulating tube 810, reflecting surface 818, thin-film coating 826 and epoxy 824. Reflecting tube 806 and spacer tube 808 are fused to optical fiber 802, which has its protective coating removed in the region inside of encapsulating tube 810. Encapsulating tube 810 is also fused to the outer surface of reflecting tube 806 and spacer tube 808, thus creating a hermetic seal around space 820. Preferably reflecting tube 806, spacer tube 808, and encapsulating tube 810 are made of fused silica.

Optical tap 800 is similar in construction and design to optical tap 100 of FIG. 1 except that the positions of reflecting tube 806 and spacer tube 808 are reversed relative to reflecting tube 106 and spacer tube 108 of FIG. 1. In addition, reflecting tube 806 has thin-film interference coating 826 deposited on one end prior to assembly. Coating 826 is designed to reflect a specific wavelength of light λr while allowing other wavelengths to pass through. Such thin-film coatings are well known in the art of filter fabrication (see for example, Chapter 7.6.6, "Interference Filters", by M. Born and E. Wolf, of Principles of Optics, Sixth Ed. (© 1980, Pergamon Press Ltd.), pages 347–351; which is incorporated by reference herein).

Optical energy 812 encounters tapered region 804 and is split into optical energy that is coupled into the cladding of optical fiber 802 and optical energy 816 that remains in the core. The optical energy coupled into the cladding of fiber 802 expands radially outward entering into the glass matrix of reflecting tube 806. The portion 814 of optical energy entering the glass matrix of reflecting tube 806 impinges on coating 826 and is partially reflected backward. In particular, if the wavelength of optical energy 814 is different from λr by more than the bandwidth Δλ of coating 826, then the majority of optical energy 814 passes through coating 826. If, on the other hand, the wavelength of optical energy 814 is equal to λr, the majority of optical energy 814 is reflected backward. In this latter case, the reflected optical energy encounters reflecting surface 818 and is reflected downward. Thus, only optical energy having wavelength matched to the wavelength of coating 826 emerges from optical tap 800.

Although the preferred embodiment shown in FIG. 1 uses a fiber taper to couple light into the cladding of optical fiber 102, the coupling is not so limited. For example, FIGS. 9–12 illustrate other means for coupling light from a guided mode into the cladding modes of an optical fiber, all of which are well known in the art, that could be used in lieu of that shown in FIG. 1.

Figure 9:
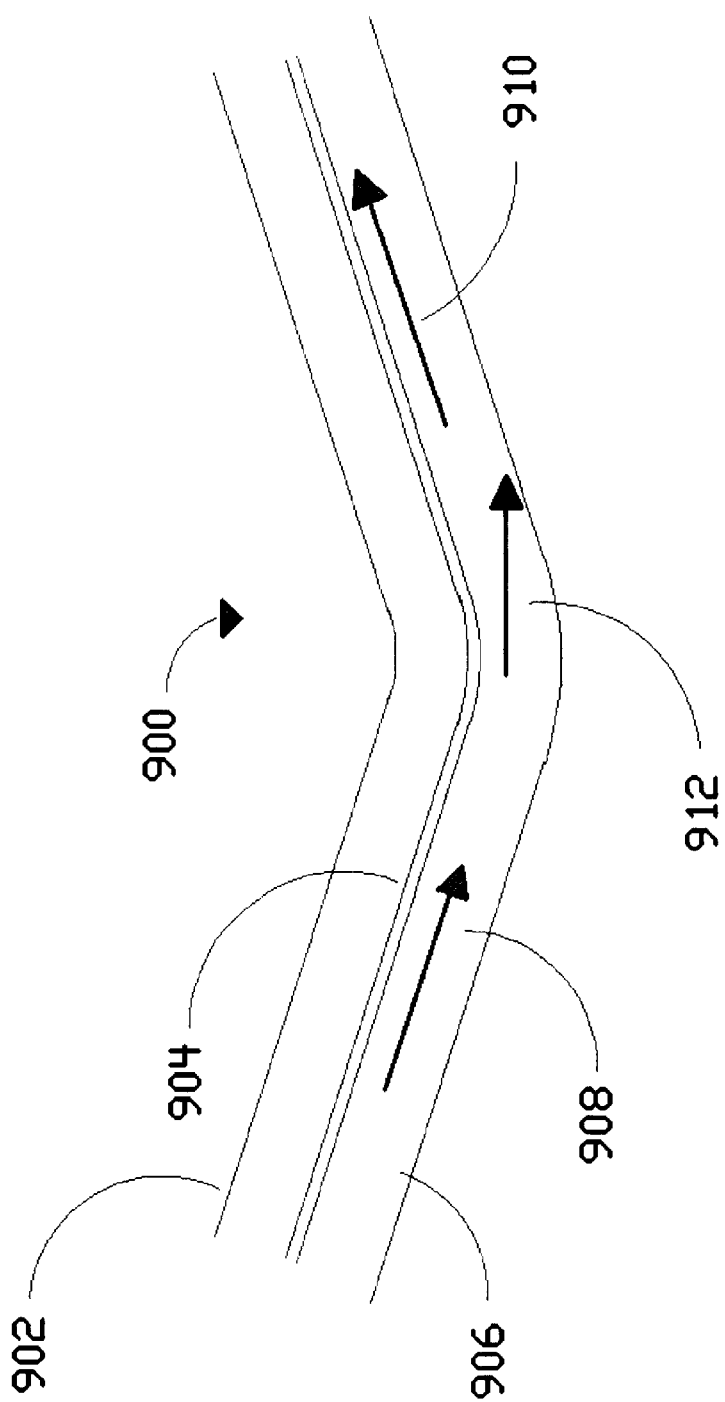
FIG. 9 is an illustration of a conventional microbend in an optical fiber used to couple optical energy into the cladding modes.

For example, FIG. 9 shows fiber bend 900 comprising optical fiber 902, fiber core 904, and fiber cladding 906. Bend 900 is formed by applying heat locally to fiber 902 while holding it in a curved trajectory as taught in U.S. Pat. No. 5,708,265. Input optical energy 908, which is initially in fiber core 904, is split at the bend into guided light 910 and cladding light 912.

Figure 10:
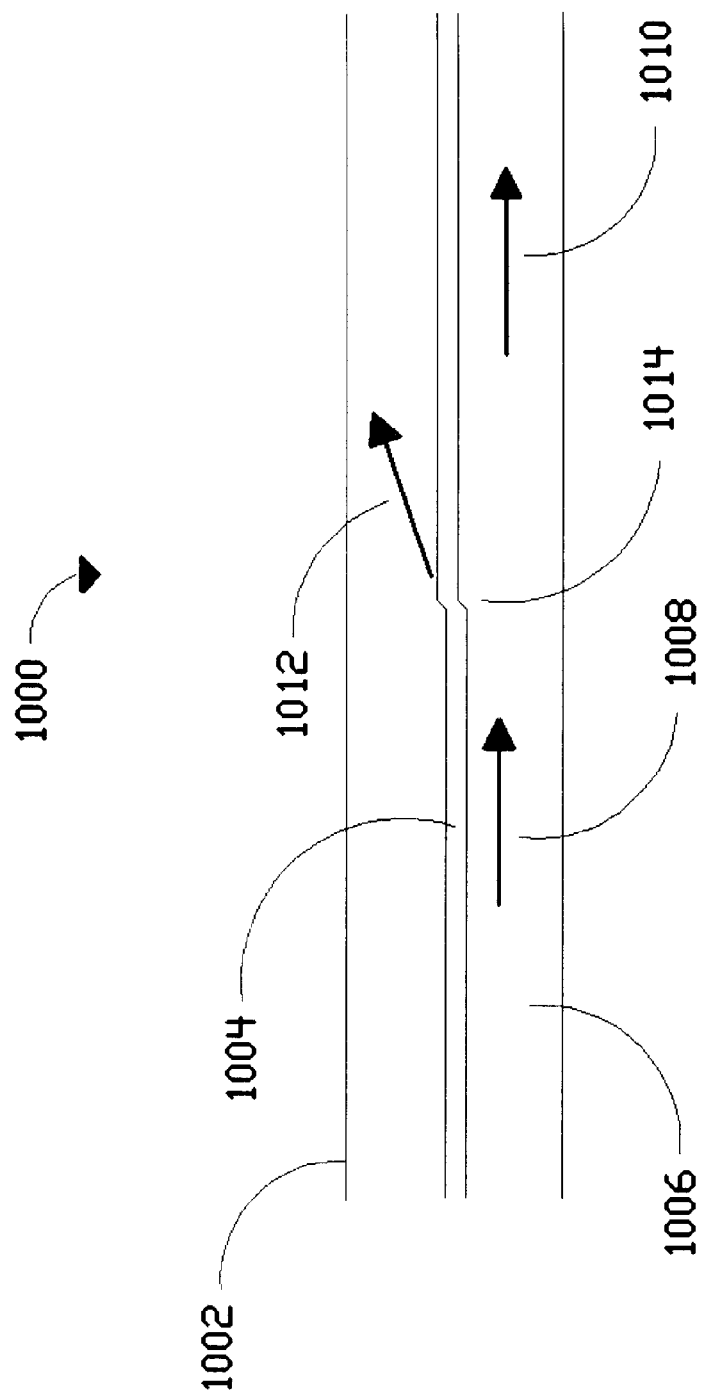
FIG. 10 is an illustration of a conventional misaligned fusion splice used to couple optical energy into the cladding modes of a fiber.

FIG. 10 shows cladding mode coupler 1000 comprising optical fiber 1002, fiber core 1004, fiber cladding 1006 and core discontinuity 1014. Cladding mode coupler 1000 is formed by fusing two fiber ends together with a slight offset in the position of their cores to create core discontinuity 1014. Input optical energy 1008, which is initially in fiber core 1004, is split at core discontinuity 1014 into guided light 1010 and cladding light 1012. The formation of fiber core discontinuity 1014 is well known in the art of fiber attenuator manufacturing.

Figure 11:
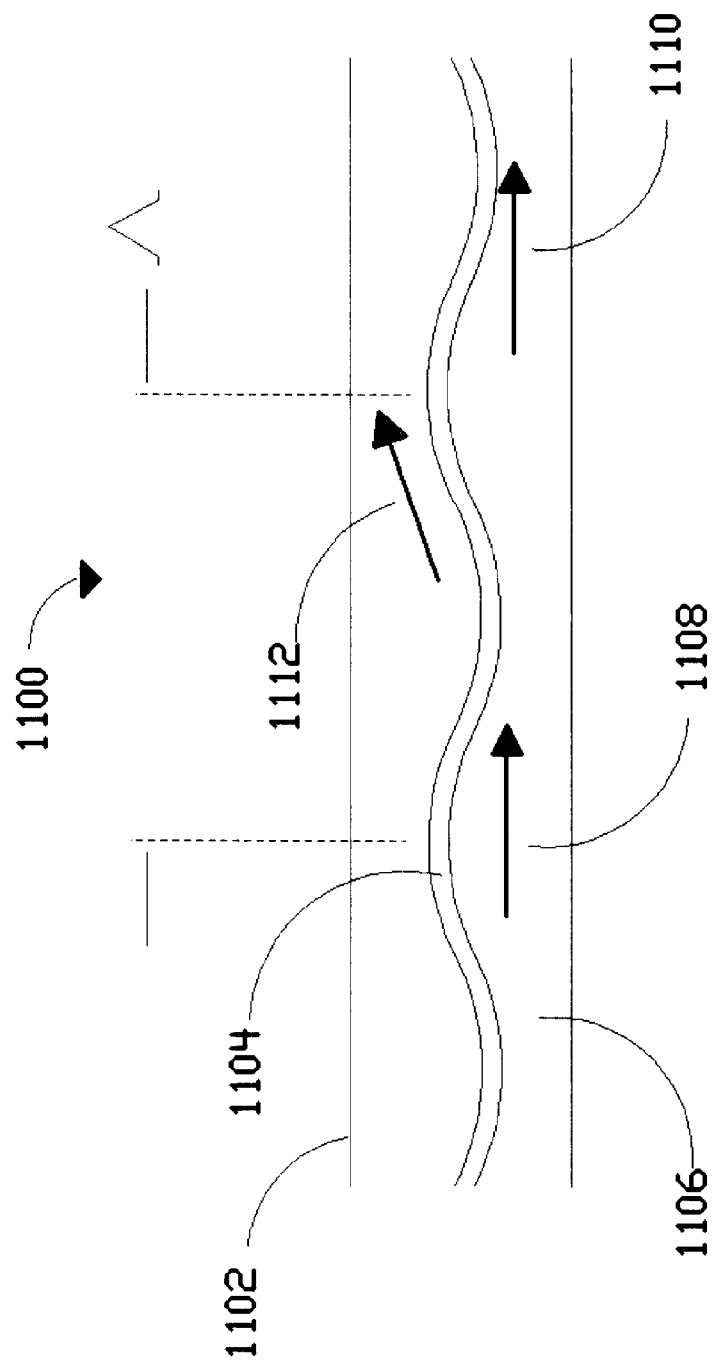
FIG. 11 is an illustration showing a conventional, periodically deformed core used to couple optical energy into the cladding modes of a fiber.
Figure 12:
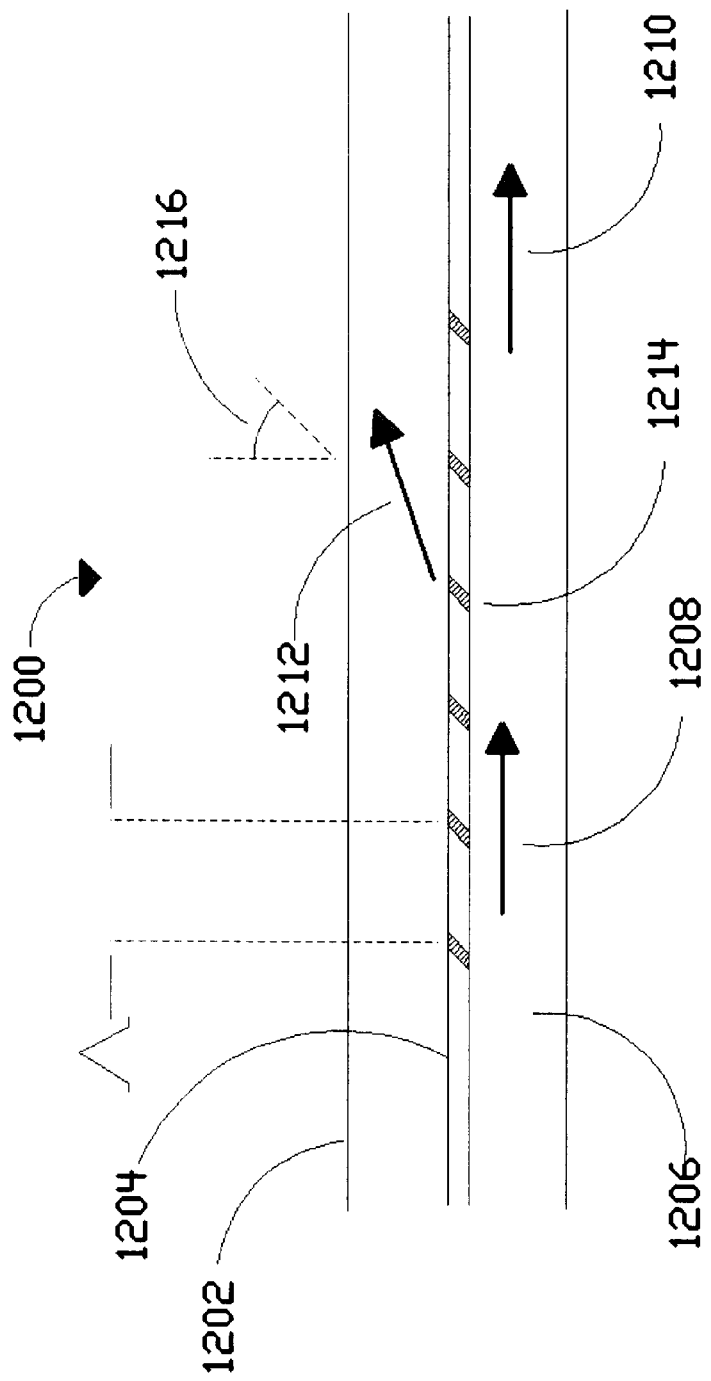
FIG. 12 an illustration showing a conventional phase grating used to couple optical energy into the cladding modes of a fiber.

FIGS. 11 and 12 show additional means for coupling optical power into the cladding of an optical fiber in which a periodic perturbation is induced in the fiber core. Such periodic perturbations are known in the art as gratings. Grating coupling of light from a guided mode to a cladding mode occurs at a wavelength $\lambda c$ determined by the spatial period of the grating $\Lambda$ (shown in FIGS. 11 and 12), the effective index of the guided mode $n_g$, and the effective index of the cladding mode $n_c$ (see for example, D. Marcuse, *Light Transmission Optics* (© 1989, Krieger Publishing Co., Inc.), pages 61–81). In particular, maximum coupling occurs when the following phase matching condition is met: $n_g - n_c = \lambda c / \Lambda$. Thus, power monitors using optical taps constructed using gratings to couple optical power into the cladding would selectively measure the optical power within a single band of wavelengths.

In the example shown in FIG. 11, a grating is created by periodically deforming the core according to the teachings of U.S. Pat. No. 5,411,566 (issued to C. D. Poole et al on May 2, 1995), which is incorporated by reference herein. In FIG. 12, a permanent phase grating is created in the fiber core using the technique taught in U.S. Pat. No. 5,647,039 (issued to J. B. Judkins et al on Jul. 8, 1997), which is also incorporated by reference herein. The cladding mode couplers shown in FIGS. 11 and 12 could be advantageously used to construct optical taps that are wavelength selective.

In the preferred embodiment shown in FIG. 3, tube preform 300 from which reflecting tube 106 and spacer tube 108 are drawn is doped with $GeO_2$ primarily to reduce the excess loss incurred when collapsing reflecting tube 106 and spacer tube 108 onto optical fiber 102. However, by tailoring the doping profile of preform 300, the increased refractive index caused by introducing $GeO_2$ can be advantageously used to alter the performance of optical tap 100 by creating a waveguide.

For example, by reducing diameter D2 of the doped region 302 shown in FIG. 3, while at the same time raising the level of concentration of $GeO_2$ to 5 mole %, the resulting refractive index profile of reflecting tube 106 of FIG. 1 would cause light to become trapped in the doped region. Thus reflecting tube 106 could be made substantially longer without losing any of the optical energy emerging from optical fiber 102. This waveguide effect can be advantageously used to increase the efficiency of optical tap 100 of FIG. 1, since by increasing the length of reflecting tube 106, a larger fraction of optical energy will escape the cladding of optical fiber 102 and become trapped in the glass matrix of reflecting tube 106. As a consequence, a greater fraction of optical energy will be reflected by reflecting surface 118 and emerge from optical tap 100. In addition, the wavelength dependence of the tap efficiency can be reduced. For example, the efficiency of optical tap 100 of FIG. 1 will tend to increase with wavelength owing to the tendency of longer wavelength light to expand more quickly into the glass matrix of reflecting tube 106. By creating a waveguide in the glass matrix of reflecting tube 106, this wavelength dependence may likely be diminished by increasing the length of reflecting tube 106.

Figure 13:
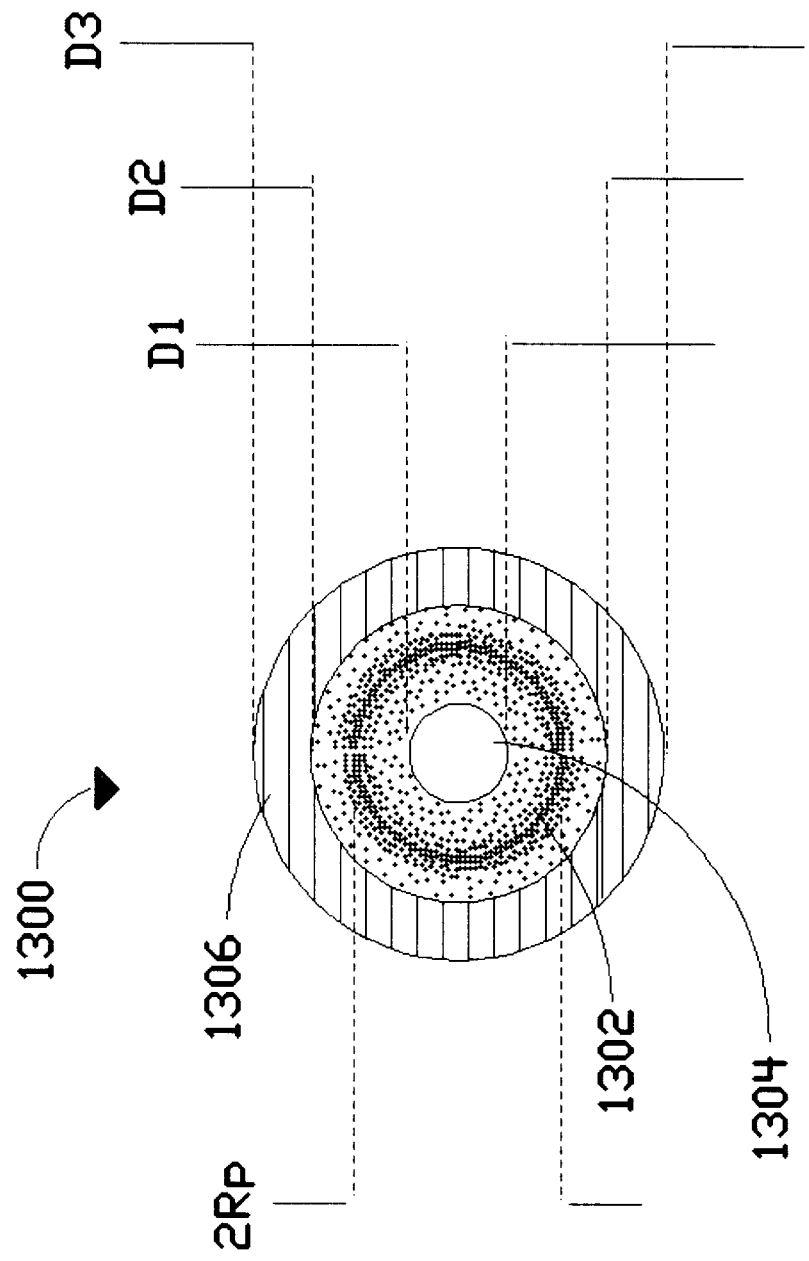
FIG. 13 is an end view of an alternative embodiment of the tube preform of FIG. 3.
Figure 14:
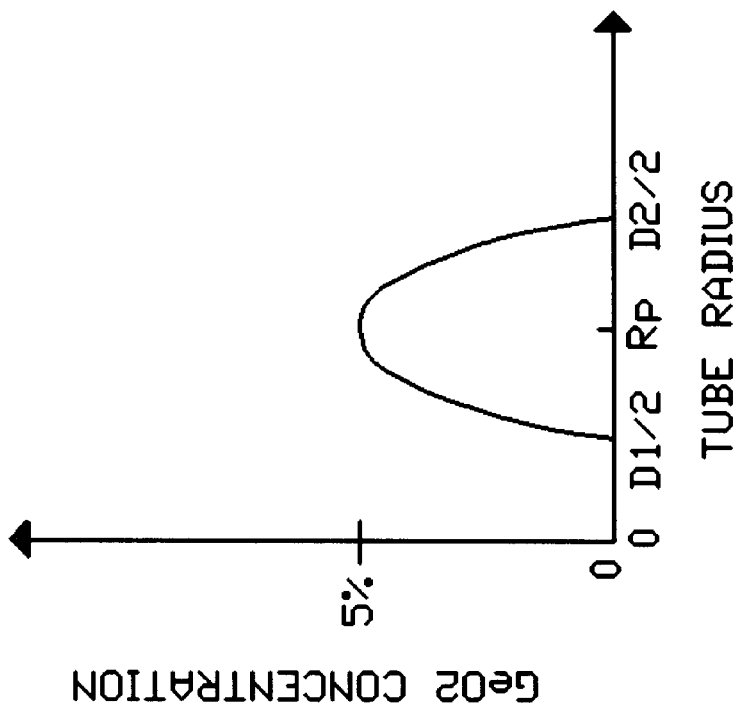
FIG. 14 is a graph of the refractive index of the tube preform of FIG. 13 plotted as a function of tube radius.

FIG. 13 shows an end view of tube preform 1300 comprising radially varying doped region 1302, central bore 1304 and surrounding silica layer 1306. FIG. 14 shows a graph of the concentration of $GeO_2$ in preform 1300 as a function of preform radius. The density of $GeO_2$ and the corresponding refractive index reaches a maximum at radius Rp and decreases with increasing and decreasing radius from that point. With this index profile, light entering the glass matrix of reflecting tube 106 will become trapped in the region around radius Rp. The doping profile of FIGS. 13 and 14 may be advantageously used to form a waveguide away from the interface between reflecting tube 106 and the cladding of optical fiber 102. By keeping optical power away from this boundary, scattering due to imperfections at the interface is advantageously reduced.

The present invention thus provides a means for coupling optical energy out of an optical fiber that is efficient, highly reliable, and easily integrated into existing opto-electronic packaging.

Clearly those skilled in the art can readily modify my inventive teachings. In that regard, alternative embodiments of my invention could use a reflecting surface that is angled below the angle for total internal reflection in order to create an optical tap that is highly polarization sensitive. Such taps would be useful for polarization sensors in fiber optic systems. Alternatively, reflecting tubes, that have complex index profiles or that have the surrounding pure silica layer shown in FIG. 3 removed, could be used. Also, alternative embodiments could make use of thin-film coatings, on the reflecting tube of FIG. 8, to provide a wide variety of wavelength dependencies in the sensitivity of the optical tap.

Although various embodiments which incorporate the teachings of the present invention have been shown and described in considerable detail herein, those skilled in the art can readily devise many other embodiments that still utilize these teachings.

I claim:

1. A fiber-optic tap for transferring optical energy out of an optical fiber comprising:
   an elongated housing;
   an optical fiber extending longitudinally through said housing;
   a structure, integral with the optical fiber, which induces cladding modes within the optical fiber, such that optical energy in the cladding modes propagates outward from the structure; and
   a glass member in optical communication with the optical fiber for capturing said optical energy and having a reflecting surface for reflecting the optical energy away from the fiber wherein said glass member is fused to cladding of the optical fiber.

2. The fiber optic tap in claim 1 wherein the structure comprises a tapered section of said optical fiber.

3. The fiber optic tap in claim 1 wherein the structure comprises a bend in a section of said optical fiber.

4. The fiber optic tap in claim 1 wherein the structure comprises a misaligned fusion splice.

5. The fiber optic tap in claim 1 wherein the structure comprises a periodic deformation of said optical fiber.

6. The fiber optic tap in claim 1 wherein the structure comprises a phase grating induced in said optical fiber.

7. The fiber optic tap in claim 1 wherein the reflecting surface is positioned at an angle greater than or equal to 44 degrees relative to the perpendicular of said optical fiber axis.

8. The fiber optic tap in claim 7 wherein the reflecting surface comprises a polished surface.

9. The fiber optic tap in claim 1 wherein said glass member is composed of silica doped with an impurity to raise a refractive index of the glass member and lower a softening point temperature of the glass member both relative to corresponding values for pure silica.

10. The fiber optic tap in claim 9 wherein said glass member is doped to form a waveguide which spatially confines optical energy within said glass member.

11. An apparatus for measuring optical power being carried by an optical fiber comprising:

a housing;

the optical fiber extending longitudinally through said housing;

a structure, integral with the optical fiber, which induces cladding modes within the optical fiber, such that optical energy in the cladding modes propagates outward from the structure;

a glass member in optical communication with said optical fiber for capturing said optical energy and having a reflecting surface for reflecting the optical energy away from said fiber; and a detector contained within said housing and in optical communication with said reflecting surface for detecting optical power reflected from the fiber and, in turn, representative of the optical power carried by the fiber.

12. The apparatus in claim 11 wherein the structure comprises a tapered section of said optical fiber.

13. The apparatus in claim 11 wherein the structure comprises a bend in a section of said optical fiber.

14. The apparatus in claim 11 wherein the structure comprises a misaligned fusion splice.

15. The apparatus in claim 11 wherein the structure comprises a periodic deformation of said optical fiber.

16. The apparatus in claim 11 wherein the structure comprises a phase grating induced in said optical fiber.

17. The apparatus in claim 11 wherein said reflecting surface is positioned at an angle greater than or equal to 44 degrees relative to the perpendicular of said optical fiber axis.

18. The apparatus in claim 17 wherein the reflecting surface comprises a polished surface.

19. The apparatus in claim 11 wherein said glass member is composed of silica doped with an impurity to raise a refractive index of the glass member and lower a softening point temperature of the glass member both relative to corresponding values for pure silica.

20. The apparatus in claim 19 wherein said glass member is doped to form a waveguide which spatially confines optical energy within said glass member.

21. A fiber optic tap for transferring optical energy out of an optical fiber, comprising:

a structure, integral with the optical fiber, which induces cladding modes within the optical fiber, such that optical energy in the cladding modes propagates outward from the structure; and a reflecting surface, in optical communication with the optical fiber, for reflecting the optical energy away from the optical fiber, wherein said reflecting surface is comprised of a glass-air interface.

22. The fiber optic tap in claim 21 wherein the structure comprises a bend in a section of said optical fiber.

23. The fiber optic tap in claim 22 wherein the glass-air interface is oriented at an angle greater than or equal to 44 degrees relative to a direction perpendicular to a longitudinal axis of said optical fiber.

24. The fiber optic tap in claim 21 wherein the glass-air interface is oriented at an angle greater than or equal to 44 degrees relative to a direction perpendicular to a longitudinal axis of said optical fiber.

25. Apparatus for measuring optical power being carried by an optical fiber, the apparatus comprising:

a housing;

the optical fiber extending longitudinally through said housing;

a structure, integral with the optical fiber, which induces cladding modes within the optical fiber, such that optical energy in the cladding modes propagates outward from the structure;

a reflecting surface, in optical communication with the optical fiber, for reflecting the optical energy away from the optical fiber, wherein said reflecting surface is comprised of a glass-air interface; and a detector contained within said housing and in optical communication with said reflecting surface for detecting optical power reflected from the fiber and, in turn, representative of the optical power carried by the fiber.

26. The apparatus in claim 25 wherein the structure comprises a bend in a section of said optical fiber.

27. The apparatus in claim 26 wherein the glass-air interface is oriented at an angle greater than or equal to 44 degrees relative to a direction perpendicular to a longitudinal axis of said optical fiber.

28. The apparatus in claim 25 wherein the glass-air interface is oriented at an angle greater than or equal to 44 degrees relative to a direction perpendicular to a longitudinal axis of said optical fiber.

* * * * *